(12) United States Patent
Maguire

(10) Patent No.: US 7,895,726 B2
(45) Date of Patent: Mar. 1, 2011

(54) TUBING CONNECTOR AND METHOD OF SEALING TUBING SECTIONS

(75) Inventor: Patrick Glen Maguire, Cypress, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 1665 days.

(21) Appl. No.: 10/848,544

(22) Filed: May 18, 2004

(65) Prior Publication Data
US 2005/0184521 A1 Aug. 25, 2005

(30) Foreign Application Priority Data
May 22, 2003 (GB) .................................. 0311721.5

(51) Int. Cl.
- B21D 33/00 (2006.01)
- B21D 39/00 (2006.01)
- E21B 23/00 (2006.01)
- F16L 25/00 (2006.01)
- F16L 41/00 (2006.01)

(52) U.S. Cl. ............ 29/505; 29/507; 29/523; 29/890.14; 285/222; 285/330; 166/207

(58) Field of Classification Search .................... 29/456, 29/505, 507, 522.1, 523, 890.14; 255/100, 255/222, 291.2, 330, 391; 166/207; 403/277
See application file for complete search history.

(56) References Cited

U.S. PATENT DOCUMENTS

| | | | |
|---|---|---|---|
| 268,868 A | 12/1882 | Collins | |
| 782,349 A | 2/1905 | Marshall | |
| 1,678,640 A | 7/1928 | Hall | |
| 1,820,644 A | 8/1931 | Bach | |
| 2,155,370 A | 4/1939 | Hall et al. | |
| 2,217,370 A | 10/1940 | Johnston | |
| 2,226,804 A | 12/1940 | Carroll | |
| 2,341,670 A | 2/1944 | Stinson | |
| 2,407,552 A | 9/1946 | Hoesel | |
| 2,751,238 A | 6/1956 | Vegren | |
| 2,858,894 A | 11/1958 | Akeyson | |
| 2,873,985 A | 2/1959 | Baldwin, Jr. | |
| 2,898,136 A | 8/1959 | Hall, Sr. et al. | |
| 3,062,568 A | 11/1962 | Andresen et al. | |

(Continued)

FOREIGN PATENT DOCUMENTS

DE 3413792 11/1985

(Continued)

OTHER PUBLICATIONS

GB Search Report dated Sep. 17, 2003 from GB Application No. 0311721.5.

(Continued)

*Primary Examiner* — David P Bryant
*Assistant Examiner* — Alexander P Taousakis
(74) *Attorney, Agent, or Firm* — Patterson & Sheridan, L.L.P.

(57) ABSTRACT

There is disclosed a connector for tubing, in particular, expandable tubing sections. There is also disclosed a method of sealing a connection between tubing sections, in particular, expandable tubing sections.

In one embodiment of the invention, a connector (10) is disclosed which is suitable for coupling expandable tubing sections (11,13) together. The connector (10) comprises first and second portions (12,14) adapted to be provided on respective expandable tubing sections (11, 13), at least one of the portions (12,14) including a seal profile (16) which is adapted to be urged into sealing engagement with the other portion (12,14) on expansion thereof.

29 Claims, 4 Drawing Sheets

U.S. PATENT DOCUMENTS

| | | | |
|---|---|---|---|
| 3,105,556 A | 10/1963 | Raulins |
| 3,353,599 A | 11/1967 | Swift |
| 3,419,079 A | 12/1968 | Current |
| 3,759,553 A | 9/1973 | Carter |
| 3,766,991 A | 10/1973 | Brown |
| 3,855,126 A | 12/1974 | Smith |
| 3,857,450 A | 12/1974 | Guier |
| 3,913,687 A | 10/1975 | Gyongyosi et al. |
| 3,989,284 A | 11/1976 | Blose |
| 4,076,280 A | 2/1978 | Young |
| 4,140,337 A | 2/1979 | Arcella et al. |
| 4,281,858 A | 8/1981 | Bowyer |
| 4,423,889 A | 1/1984 | Weise |
| 4,449,596 A | 5/1984 | Boyadjieff |
| 4,491,351 A | 1/1985 | Galle, Jr. et al. |
| 4,550,937 A | 11/1985 | Duret |
| 4,591,195 A | 5/1986 | Chelette et al. |
| 4,601,492 A | 7/1986 | George |
| 4,611,838 A | 9/1986 | Heilmann et al. |
| 4,619,472 A | 10/1986 | Kozono et al. |
| 4,625,796 A | 12/1986 | Boyadjieff |
| 4,659,119 A | 4/1987 | Reimert |
| 4,671,544 A | 6/1987 | Ortloff |
| 4,703,959 A | 11/1987 | Reeves et al. |
| 4,711,474 A | 12/1987 | Patrick |
| 4,712,955 A | 12/1987 | Reece et al. |
| 4,753,460 A | 6/1988 | Tung |
| 4,754,807 A | 7/1988 | Lange |
| 4,771,829 A | 9/1988 | Sparlin |
| 4,778,008 A | 10/1988 | Gonzalez et al. |
| 4,786,090 A | 11/1988 | Mott |
| 4,793,422 A | 12/1988 | Krasnov |
| 4,813,493 A | 3/1989 | Shaw et al. |
| 4,822,081 A | 4/1989 | Blose |
| 4,878,546 A | 11/1989 | Shaw et al. |
| 4,892,337 A | 1/1990 | Gunderson et al. |
| 4,917,409 A | 4/1990 | Reeves |
| 4,985,975 A | 1/1991 | Austin et al. |
| 5,015,017 A | 5/1991 | Geary |
| 5,048,871 A | 9/1991 | Pfeiffer et al. |
| 5,066,052 A | 11/1991 | Read |
| 5,069,761 A | 12/1991 | Krings et al. |
| 5,098,241 A | 3/1992 | Aldridge et al. |
| 5,181,570 A | 1/1993 | Allwin et al. |
| 5,251,709 A | 10/1993 | Richardson |
| 5,339,895 A | 8/1994 | Arterbury et al. |
| 5,348,095 A | 9/1994 | Worrall et al. |
| 5,350,202 A | 9/1994 | Fritz et al. |
| 5,360,240 A | 11/1994 | Mott |
| 5,366,012 A | 11/1994 | Lohbeck |
| 5,388,651 A | 2/1995 | Berry |
| 5,415,442 A | 5/1995 | Klementich |
| 5,480,196 A | 1/1996 | Adams, Jr. |
| 5,518,072 A | 5/1996 | McTernaghan |
| 5,520,422 A | 5/1996 | Friedrich et al. |
| 5,667,011 A | 9/1997 | Gill et al. |
| 5,743,333 A | 4/1998 | Willauer et al. |
| 5,782,503 A | 7/1998 | Noel et al. |
| 5,787,980 A | 8/1998 | Sparlin et al. |
| 5,810,401 A | 9/1998 | Mosing et al. |
| 5,855,242 A | 1/1999 | Johnson |
| 5,901,789 A | 5/1999 | Donnelly et al. |
| 5,906,398 A | 5/1999 | Larsen et al. |
| 5,924,745 A | 7/1999 | Campbell et al. |
| 5,971,443 A | 10/1999 | Noel et al. |
| 5,984,568 A | 11/1999 | Lohbeck |
| 6,012,522 A | 1/2000 | Donnelly et al. |
| 6,109,349 A | 8/2000 | Simone et al. |
| 6,142,230 A | 11/2000 | Smalley et al. |
| 6,158,507 A | 12/2000 | Rouse et al. |
| 6,158,785 A | 12/2000 | Beaulier et al. |
| 6,189,619 B1 | 2/2001 | Wyatt et al. |
| 6,203,766 B1 | 3/2001 | Kawakami et al. |
| 6,270,127 B1 | 8/2001 | Enderle |
| 6,273,634 B1 | 8/2001 | Lohbeck |
| 6,315,040 B1 | 11/2001 | Donnelly |
| 6,322,109 B1 | 11/2001 | Campbell et al. |
| 6,322,110 B1 | 11/2001 | Banker et al. |
| 6,325,424 B1 | 12/2001 | Metcalfe et al. |
| 6,343,813 B1 | 2/2002 | Olson et al. |
| 6,409,175 B1 | 6/2002 | Evans et al. |
| 6,454,013 B1 | 9/2002 | Metcalfe |
| 6,457,532 B1 | 10/2002 | Simpson |
| 6,457,537 B1 | 10/2002 | Mercer et al. |
| 6,481,760 B1 | 11/2002 | Noel et al. |
| 6,543,816 B1 | 4/2003 | Noel |
| 6,554,287 B1 | 4/2003 | Sivley, IV et al. |
| 6,581,980 B1 | 6/2003 | DeLange et al. |
| 6,607,220 B2 | 8/2003 | Sivley, IV |
| 6,619,696 B2 | 9/2003 | Baugh et al. |
| 6,622,797 B2 | 9/2003 | Sivley, IV |
| 6,648,071 B2 | 11/2003 | Hackworth et al. |
| 6,685,236 B2 | 2/2004 | Setterberg, Jr. |
| 6,708,767 B2 | 3/2004 | Harrall et al. |
| 6,722,443 B1 | 4/2004 | Metcalfe |
| 6,767,035 B2 | 7/2004 | Hashem |
| 6,789,822 B1 | 9/2004 | Metcalfe |
| 6,792,665 B2 | 9/2004 | Baugh et al. |
| 2001/0038206 A1 | 11/2001 | Olechnowicz et al. |
| 2002/0027363 A1 | 3/2002 | Mallis et al. |
| 2002/0070031 A1 | 6/2002 | Voll et al. |
| 2002/0079106 A1 | 6/2002 | Simpson |
| 2002/0163192 A1 | 11/2002 | Coulon et al. |
| 2003/0024708 A1 | 2/2003 | Ring et al. |
| 2003/0029621 A1 | 2/2003 | Haynes |
| 2003/0067166 A1 | 4/2003 | Sivley, IV |
| 2003/0067169 A1 | 4/2003 | Church |
| 2003/0075338 A1 | 4/2003 | Sivley, IV |
| 2003/0168858 A1 | 9/2003 | Hashem |
| 2003/0168859 A1 | 9/2003 | Watts |
| 2003/0234538 A1 | 12/2003 | Hashem |
| 2004/0017081 A1 | 1/2004 | Simpson et al. |
| 2004/0055759 A1 | 3/2004 | Sivley, IV |
| 2004/0104575 A1 | 6/2004 | Ellington et al. |
| 2004/0108119 A1 | 6/2004 | Maguire et al. |
| 2004/0113428 A1 | 6/2004 | Macaulay |
| 2004/0135370 A1 | 7/2004 | Evans et al. |
| 2004/0145184 A1 | 7/2004 | Setterberg, Jr. |
| 2004/0194966 A1 | 10/2004 | Zimmerman |
| 2004/0194968 A1 | 10/2004 | Metcalfe |
| 2004/0231839 A1 | 11/2004 | Ellington et al. |
| 2004/0262919 A1 | 12/2004 | Dutilleul et al. |
| 2005/0023001 A1 | 2/2005 | Hillis |
| 2005/0093250 A1 | 5/2005 | Santi et al. |
| 2005/0212290 A1 | 9/2005 | Durand et al. |
| 2005/0236159 A1* | 10/2005 | Costa et al. ............... 166/380 |

FOREIGN PATENT DOCUMENTS

| | | |
|---|---|---|
| EP | 0171144 | 2/1986 |
| EP | 0447346 | 9/1991 |
| EP | 0 659 975 | 6/1995 |
| EP | 0 803 637 | 10/1997 |
| EP | 1 106 778 | 6/2001 |
| EP | 1 167 686 A2 | 1/2002 |
| FR | 2 742 177 | 6/1997 |
| GB | 706342 | 3/1954 |
| GB | 1037010 | 7/1966 |
| GB | 2 033 942 | 5/1980 |
| GB | 2 099 529 | 12/1982 |
| GB | 2 161 569 | 1/1986 |
| GB | 2 345 308 | 7/2000 |
| GB | 2 345 935 | 7/2000 |
| GB | 2 371 574 | 7/2002 |
| GB | 2441204 | 2/2008 |
| JP | 2002-286183 | 10/2002 |
| RU | 1367586 | 11/1996 |
| WO | WO 90/11455 | 10/1990 |
| WO | WO 93/12323 | 6/1993 |
| WO | WO 93/25800 | 12/1993 |
| WO | WO 96/37680 | 11/1996 |
| WO | WO 96/37681 | 11/1996 |
| WO | WO 96/37687 | 11/1996 |
| WO | WO 97/17524 | 5/1997 |
| WO | WO 97/21901 | 6/1997 |
| WO | WO 98/22690 | 5/1998 |
| WO | WO 98/32948 | 7/1998 |
| WO | WO 98/42947 | 10/1998 |

| WO | WO 98/47805 | 10/1998 |
| WO | WO 00/08301 | 2/2000 |
| WO | WO 00/37766 | 6/2000 |
| WO | WO 01/18355 A1 | 3/2001 |
| WO | WO 01/60545 | 8/2001 |
| WO | WO 02/10551 | 2/2002 |
| WO | WO 02/059458 | 8/2002 |
| WO | WO 02/075107 A1 | 9/2002 |
| WO | WO 02/075197 | 9/2002 |
| WO | WO 03/006788 | 1/2003 |
| WO | WO 03/032331 | 4/2003 |
| WO | WO 03/036012 | 5/2003 |
| WO | WO 03/036017 | 5/2003 |
| WO | WO 03/048503 | 6/2003 |
| WO | WO 03/048506 | 6/2003 |
| WO | WO 03/078882 | 9/2003 |
| WO | WO-2005/003511 | 1/2005 |
| WO | WO-2005/106309 | 11/2005 |
| WO | WO-2005/113190 | 12/2005 |

OTHER PUBLICATIONS

Patrick G. Maguire, et al., U.S. Appl. No. 10/313,920, filed Dec. 6, 2002, Entitled "Wire Lock Expandable Connection".
EP Search Report, EP Application No. 04 25 2627, dated Aug. 23, 2004.
U.S. Appl. No. 10/741,418, filed Dec. 19, 2003, Harrall.
U.S. Appl. No. 10/940,485, filed Sep. 14, 2004, Metcalfe.
US 3,851,963, 12/1974, MacKenzie (withdrawn)

* cited by examiner

TUBING CONNECTOR AND METHOD OF SEALING TUBING SECTIONS

CROSS-REFERENCE TO RELATED APPLICATIONS

This application claims benefit of a British patent application serial number GB 0311721.5, filed May 22, 2003, which is herein incorporated by reference.

BACKGROUND OF THE INVENTION

1. Field of the Invention

The present invention relates to a connector for tubing. In particular, but not exclusively, the present invention relates to the sealing of a connector for expandable downhole tubing sections.

2. Description of the Related Art

In the oil and gas exploration and production industry, expandable tubing has been developed and has a variety of uses. These include expandable borehole casing and liner, and expandable sand exclusion based tubing assemblies or sandscreens, such as that disclosed in International patent publication no WO97/17524 (Shell), and as sold under the ESS Trademark by the present applicant.

Expandable tubing offers a number of advantages over conventional borehole tubing, as the expandable tubing can be run into a borehole in an unexpanded state and subsequently expanded downhole. This allows the tubing to be run through existing tubing and then expanded to a larger diameter within the borehole.

The expandable tubing sections typically include a male threaded portion (pin) and a female threaded portion (box) at opposite ends, for joining adjacent sections of tubing together end to end. The pin and box of adjacent tubing sections thus form connectors for coupling the tubing sections together. A proposed connector assembly for expandable tubing is disclosed in the Applicant's U.S. Pat. No. 5,924,745, the disclosure of which is incorporated herein by way of reference.

Maintaining a seal between the pin and box portions post expansion can be problematic due to elastic recovery, which tends to cause the pin to draw inwardly out of contact with the box.

The Applicant's International patent publication No. WO02/075107 discloses a method of forming a seal between two tubular members by providing a first tubular member having a recess with a sealing member located in the recess, and by expanding the first tubular member such that the sealing member engages an inner surface of a second tubular member.

It is amongst the objects of embodiments of the present invention to obviate or mitigate the foregoing disadvantage.

SUMMARY OF THE INVENTION

According to a first aspect of the present invention, there is provided a connector for tubing sections, the connector comprising:

first and second portions adapted to be provided on respective tubing sections for coupling the sections together, at least one of the first and second portions including a seal profile adapted to be urged into sealing engagement with the other portion on expansion thereof.

Preferably, the connector comprises a connector for expandable tubing sections. The seal profile may be adapted to be urged into sealing engagement with the other portion on expansion of the seal profile alone, or during expansion of the first and second portions. The first and second portions, and thus the connector, may be adapted to define a substantially constant internal diameter post-expansion. This may avoid any step, upset or the like causing a relative reduction in internal diameter of the connector following expansion.

The seal profile is intended to provide an effective seal between the first and second portions after expansion, even where elastic recovery occurs, as the seal profile is positively urged into sealing engagement with the other one of the first and second portions. Preferably, the connector is for downhole tubing sections. Preferably also, the tubing sections are adapted to be coupled together prior to location of the tubing in a downhole environment. Accordingly, the first and second portions are adapted to be coupled together prior to location of the tubing in a borehole and prior to bringing the seal profile into sealing engagement with the other portion, and thus prior to expansion of the first and second portions and the seal profile.

Preferably, the seal profile is provided on the portion which is located radially inwardly or innermost when the portions are coupled together. The first and second portions may be at least partly tapered. One of the first and second portions may comprise a male portion and the other a female portion, and in particular may comprise a pin and box. The male and female portions may be tapered and may comprise a tapered pin and box, respectively. The seal profile may be adapted to be provided on the male portion. Thus expansion of the male portion may be adapted to bring the seal profile into sealing engagement with the female portion. Alternatively, the seal profile may be adapted to be provided on the female portion. Expansion of the male portion may cause a corresponding expansion of the female portion, thereby bringing the seal profile into sealing engagement with the male portion. This may have a particular utility, for example, where the tubing sections are located in a constrained fashion, such as within a non-expandable cemented casing, expansion of the tubing sections bringing the seal profile into sealing engagement with the male portion. The seal profile may therefore be provided on a radially inner surface of the female portion.

The first and second portions may include recesses which together define a continuous cavity when mated, and an insert or connector adapted to be positioned in at least a portion of the continuous cavity, according to the Applicant's U.S. patent application Ser. No. 10/313,920, the disclosure of which is incorporated herein by way of reference. Alternatively, the first and second portions may be threaded for coupling together. In a further alternative, the portions may be adapted to be coupled together in a snap, stab or latch lock fit, or in any other suitable fashion, or through a combination of the above.

The seal profile may be moveable between an unexpanded position and an expanded, sealing position, in the expanded position, the seal profile being in sealing engagement with the other one of the first and second portions. In the unexpanded position, the seal profile may be out of contact with the other one of the first and second portions. Alternatively, the seal profile may be in contact but not sealingly engaged with the other portion.

Thus the seal may be in contact but, initially, any force exerted on the seal profile may not be sufficient to produce an adequate seal. In a further alternative, the seal profile may be in sealing engagement with the other one of the first and second portions when in an unexpanded position, and may be moveable to an expanded, enhanced sealing position.

The seal profile may be deformable and is preferably plastically deformable, but may be elastically deformable and urged or retained in sealing engagement by a separate member, which may be a deformable or latching member, or a combination thereof.

Preferably, a wall of the first and/or second portion having the seal profile is of a greater cross-sectional thickness in the region of the seal portion than axially adjacent areas of the respective portion or portions. This may ensure that the seal portion does not reduce the integrity of the connection post-expansion.

The connector may include a biasing profile adapted to urge the seal profile into sealing engagement with the other one of the first and second portions on expansion. Expansion may cause the biasing profile to exert a biasing force on the seal profile, to urge the seal profile into sealing engagement. Preferably, the biasing profile is provided on the same one of the first and second portions as the seal profile. The biasing profile may initially extend proud of the respective first and second portion, and may define an upset. In this fashion, expansion of the tubing sections and thus of the first and second portions may exert a force on the biasing section, to in-turn urge the sealing profile into sealing engagement.

The biasing profile may comprise a ring, lip or wall section of the respective tubing section and may be provided on or extend from a surface of the respective first and second portion opposite a surface on which the seal portion is provided. The profiled portion may be on an inner surface and the sealing profile on an outer surface. Thus, when the tubing is expanded using an expansion tool, such as a cone, mandrel or a rotary expansion tool such as that disclosed in the Applicant's International patent publication No. WO00/37766, the biasing profile may be urged radially outwardly to exert a biasing force on the seal profile. Alternatively, the biasing profile may be on an outer surface and the seal profile on an inner surface. When the tubing is expanded, the biasing profile may contact a surface, such as the wall of a borehole, and may be restrained such that expansion causes a relative radially inward movement or displacement of the biasing profile, to exert a biasing force on the seal profile.

The seal profile may be provided on or in a recess, such as an indent, channel, groove, fold, crinkle or slot in a wall of the respective first and second portion, and may be adapted to be urged radially outwardly on expansion, to at least partly protrude proud of the recess. This allows the seal profile to be moved between a position out of sealing engagement with, and a position in sealing engagement with the other one of the first and second portions. Accordingly, this may allow the seal profile to be moved between a position in sealing engagement with, and a position in enhanced sealing engagement with the other one of the first and second portions.

The seal profile may comprise a rib, ring, lip or other protrusion. The seal profile may form an integral part of the respective first and second portion. Alternatively, the seal profile may comprise a separate member adapted to be coupled to the respective first and second portion.

In one embodiment, the other one of the first and second portions may include a seal member adapted to be sealingly engaged by the seal profile. The seal member may comprise an elastomeric or rubber material, or a metal or metal alloy of a relatively low yield strength and/or modulus of elasticity (Young's modulus), such as bronze or lead. The seal member may be mounted or formed in a recess in the other one of the first and second portions, and may be located adjacent the seal profile.

In another embodiment, the seal profile may be adapted to sealingly engage the other one of the first and second portions in a metal to metal seal. The other one of the first and second portions may define a recess for receiving the seal profile. The recess may be of a similar profile, and may be of smaller dimensions than the seal profile, to provide a good seal with the profile.

In a further embodiment, the seal profile may comprise a base profile, such as a rib, lip or ring and a seal surface mounted on the base profile, the base profile being of a material having a higher yield strength and/or modulus of elasticity than the seal surface. For example, the seal surface may comprise an elastomeric or rubber material, or a metal such as bronze or lead. The seal surface may engage in a recess or a seal as described above, or may abut a wall of the other one of the first and second portions.

The connector may comprise a plurality of seal profiles. The seal profiles may be carried by one or both of the first and second portions. It will be understood that a profiled portion may be provided corresponding to each seal profile. In the assembled connector, one or more axially adjacent seal profiles may be provided alternatively on the first and second portions, respectively.

According to a second aspect of the present invention, there is provided a connector for tubing sections, the connector comprising:

first and second portions adapted to be provided on respective tubing sections for coupling the sections together, at least one of the first and second portions including a profile adapted to be urged into engagement with the other portion on expansion thereof.

Preferably, the connector comprises a connector for expandable tubing sections wherein the profile is adapted to be urged into engagement with the other portion on expansion.

Alternatively, the connector may be for non-expandable tubing sections and may, for example, provide an enhanced seal between non-expandable tubing sections.

The profile may comprise a seal profile adapted to be urged into sealing engagement with the other portion on expansion thereof.

In alternative embodiments, the profile may comprise a locking or latching profile adapted to be urged into locking or latching engagement with the other portion on expansion thereof. The profile may therefore serve for locking or latching the first and second portions together. In a further alternative embodiment, the profile may have both a sealing and a latching or locking function. The profile may act as a lock against one or both of axial and radial movement of one of the first and second portions relative to the other. The latching profile may be adapted to engage in a corresponding recess provided in the other one of the first and second portions to latch the first and second portions relative to one another.

According to a third aspect of the present invention, there is provided tubing comprising:

at least two tubing sections, one of the sections having a first connector portion and the other section a second connector portion, the first and second portions adapted to be coupled together and at least one of the first and second portions including a profile adapted to be urged into engagement with the other portion on expansion thereof.

Preferably, the tubing is expandable and the tubing sections comprise expandable tubing sections. The tubing sections may be adapted to define a substantially constant internal diameter post expansion. This may avoid any steps, upsets or the like restricting the tubing bore.

Preferably also, the tubing comprises more than two tubing sections, each tubing section having respective first and second connector portions at opposite ends thereof for coupling the tubing sections together end to end.

Further features of the connector portions are defined above.

According to a fourth aspect of the present invention, there is provided a method of sealing a connection between tubing sections, the method comprising the steps of:

providing a profile on at least one of first and second connector portions of respective tubing sections; and urging the profile into engagement with the other portion.

The method may comprise providing a seal profile and urging the seal profile into sealing engagement with the other portion on expansion thereof. The method may comprise expanding the connector portions and/or the tubing sections to urge the profile into engagement with the other portion, expansion of the tubing sections expanding the profile. Alternatively, the method may comprise expanding the profile separately from the tubing sections/connector portions. The profile may be urged into engagement prior or subsequent to expansion of the first and second portions.

The method may comprise providing a profile as an integral part of the respective connector portion. Alternatively, the profile may be provided as a separate member adapted to be coupled to the connector portion.

A second profile, such as a biasing profile, may be provided corresponding to the first profile, and the method may comprise exerting a force on the biasing profile, to exert a biasing force on the first profile for urging the first profile into sealing engagement.

The method may comprise a method of sealing connections between tubing sections, preferably expandable tubing sections, coupled together end to end to form a tubing string. The method may further comprise expanding the tubing sections, and the internal diameter of the tubing sections may be maintained substantially constant, over at least part of a length of the tubing string, post expansion.

According to a fifth aspect of the present invention, there is provided a connector for expandable tubing sections, the connector comprising:

first and second portions adapted to be provided on respective expandable tubing sections for connecting the first and second sections together prior to expansion of said sections to secure the sections against relative movement pre-expansion, at least one of said portions including a seal profile adapted to be urged into sealing engagement with the other portion on expansion of the seal profile.

According to a sixth aspect of the present invention, there is provided a connector for expandable tubing sections, the connector comprising:

first and second portions adapted to be provided on respective expandable tubing sections for coupling the sections together, at least one of the first and second portions including a seal profile having an outer face on an outer surface of the respective portion and an inner face on an inner surface of the respective portion, whereby outward movement of the inner face of the seal profile is adapted to urge the outer face of the seal profile into sealing engagement with said other portion.

According to a seventh aspect of the present invention, there is provided expandable downhole tubing comprising:

at least two expandable tubing sections, main parts of said tubing sections being of similar unexpanded internal diameter, one of the tubing sections having a first connector portion and the other having a second connector portion, the first and second connector portions coupled together prior to expansion of the tubing to secure the tubing sections against relative movement, at least one of the first and second portions including a profile adapted to be urged into sealing engagement with the other portion on expansion thereof.

According to an eighth aspect of the present invention, there is provided a method of sealing a connection between expandable tubing sections, the method comprising the steps of:

coupling a first connector portion on a first expandable tubing section to a second connector portion on a second expandable tubing section to secure the expandable tubing sections against relative movement pre-expansion; and expanding a profile provided on at least one of the first and second connector portions to urge the profile into sealing engagement with the other one of the connector portions.

DETAILED DESCRIPTION

Figure 1:
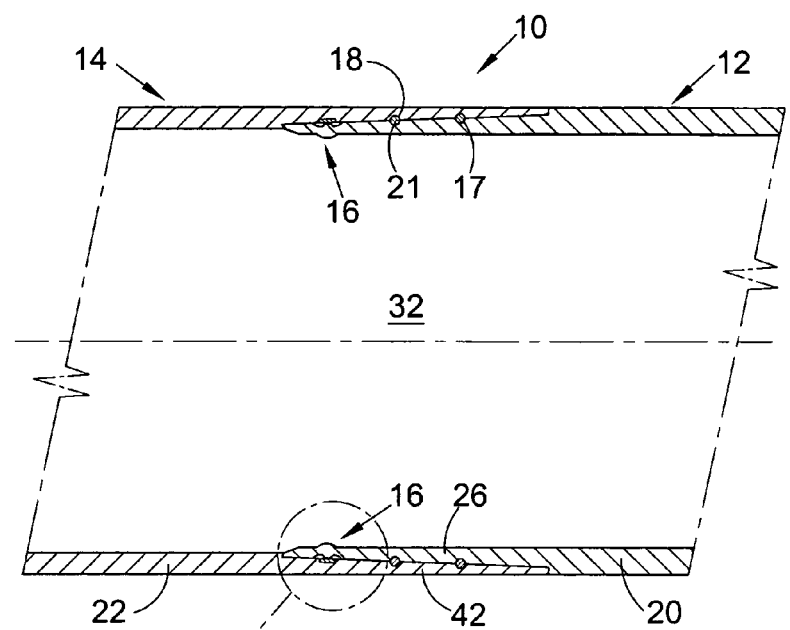
FIG. 1 is a longitudinal sectional view of a connector for expandable tubing, in accordance with an embodiment of the present invention, shown prior to expansion.

Turning firstly to FIG. 1, there is shown a longitudinal sectional view of a connector for expandable tubing in accordance with a preferred embodiment of the present invention, the connector indicated generally by reference numeral 10. The connector 10 is suitable for coupling expandable tubing sections 11, 13 (FIG. 2) together at surface, prior to location of the tubing sections in the downhole environment, and is shown in FIG. 1 prior to expansion. The tubing sections 11, 13 are shown coupled together and located in a borehole 15 in FIG. 2. The tubing sections may comprise solid or continuous-walled expandable tubing such as casing or liner, as well as other types of expandable tubing, such as slotted tubing and sand exclusion assemblies. The tubing sections 11, 13 shown in FIG. 2 comprise sections of the Applicant's commercially available ESS (Trademark) sandscreen.

The connector 10 comprises first and second portions 12, 14 adapted to be provided on respective expandable tubing sections 11, 13 for coupling the sections together, at least one of the first and second portions 12, 14 including a profile. In this embodiment, the first portion 12 carries a seal profile 16, which is adapted to be urged into sealing engagement with the second portion 14 on expansion thereof.

In more detail, the first portion 12 takes the form of a male portion and defines a pin, whilst the second portion 14 takes the form of a female portion and defines a box. The pin 12 includes a recess in the form of a helical groove 17, and the box 14 includes a corresponding helical groove 18. The grooves 17, 18 align on mating the pin and box 12, 14 at surface to define a continuous cavity, and a connector in the form of a wire 21 is located in the cavity to lock the pin and box 12, 14 together, as disclosed in the Applicant's co-pending U.S. patent application Ser. No. 10/313,920, the disclosure of which is incorporated herein by way of reference. Alternatively, the pin and box 12, 14 may be threaded for coupling together. Each section of expandable tubing 11, 13 carries a pin and box at opposite ends thereof, for coupling a number of lengths of such tubing together end to end, to form a string of expandable tubing.

The pin 12 includes a short, hollow, cylindrical body or sub 20 which is welded to the end of the tubing section 11. In a similar fashion, the box 14 includes a short sub 22 which is welded to the adjacent tubing section 13. In other embodiments, the pin and box 12, 14 may be formed integrally with the respective tubing sections 11, 13.

Figure 3A:
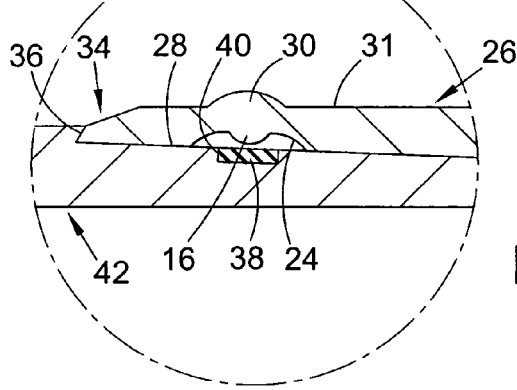
FIG. 3A (presented on same sheet as FIG. 1) is an enlarged view of part of the connector of FIG. 1.

The seal profile 16 is shown in more detail in the enlarged view of FIG. 3A, which is presented on the same sheet as FIG. 1. The seal profile 16 is located in a recess in the form of a groove 24 in a tapered portion 26 of the pin 12. Although not shown in the Figures, the groove 24 extends around a circumference of the pin tapered portion 26, and the seal profile 16 comprises a rounded lip formed in a base of the groove 24. It will be noted that in the unexpanded position shown in FIG. 3A, the lip 16 is contained within the groove 24, such that no part of the lip extends beyond an interface 28 defined between the pin and box 12, 14 when coupled together.

The structure of the pin 12 with the seal profile 16 in the groove 24 is formed by constructing the pin 12 to include a straight sided inner wall and with the lip 16 proud of the external surface of the pin. The pin is then rolled or pressed to deform the pin radially inwardly in the location of the seal lip 16, forming the groove 24 and recessing the lip with respect to the outer surface of the pin.

This process deforms the wall of the pin 12, forming a biasing profile in the form of a rounded lip 30 on an inner surface 31 of the pin tapered portion 26. The biasing lip 30 is thus formed radially inwardly of the seal lip 16, protruding into the connector bore 32 and extending circumferentially around the tapered portion. Forming the seal lip 16 and biasing lip 30 in this fashion results in the wall thickness of the pin 12 being maintained, with associated benefits in terms of strength and integrity both prior and subsequent to expansion.

When a string of expandable tubing has been assembled, the string is run into the borehole 15 and located in a desired position. An expansion tool (not shown) such as an expansion cone or mandrel, or a rotary expansion tool such as that disclosed in the Applicant's International patent publication No. WO00/37766, is then run down through the string of expandable tubing sections. The expansion tool radially expands the tubing sections 11, 13 as well as the pin 12 and box 14 of the connector 10 to a larger diameter.

The tapered portion 26 of the pin 12 experiences elastic recovery after the tool has passed down through the connector 10 and the expansion force exerted on the connector 10 is released. The tip 34 of the pin tapered portion 26 experiences end effects and tends to bend radially inwardly. However, deformation of the seal lip 16, as will be described below, ensures that a fluid-tight seal exists between the pin and box 12, 14 post expansion. In addition, the tip 34 of the tapered portion 26 is angled and engages a corresponding shoulder 36 of the box 14, to resist separation.

Figure 3B:
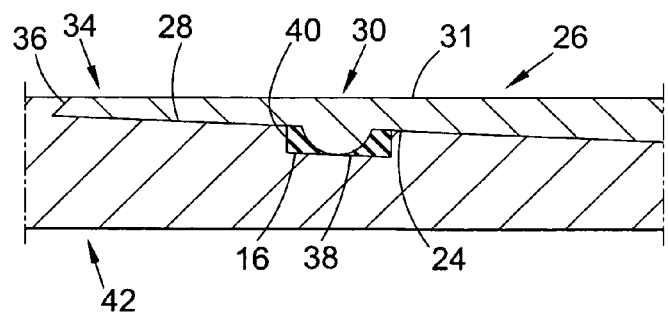
FIG. 3B (presented on same sheet as FIG. 1) is a schematic view of the connector part of FIG. 3A shown after expansion.

The seal lip 16 is urged into sealing engagement with the box 14 as follows. When the expansion tool passes down through the connector 10, the wall of the pin 12 is straightened, displacing the biasing lip 30 radially outwardly. This movement carries the seal lip 16, tending to flatten out the groove 24, causing the seal lip 16 to protrude proud of the pin 12 outside surface, as shown in FIG. 3B. This expansion brings the seal lip 16 into sealing engagement with an elastomeric or rubber seal 38, which is located in a groove 40 in a tapered portion 42 of the box sub 22. This sealing engagement between the seal lip 16 and the seal 38 is maintained even after removal of the expansion forces and thus prevents fluid ingress or egress through the connection between the pin and box 12, 14. Accordingly, no undesired fluid or solids can enter the string of expanded tubing through the connectors 10, and no fluid or solids can escape from the expanded tubing through the connector. Thus undesired sand production through the connection 10 between the ESS (Trademark) sandscreen tubing sections 11, 13 is prevented. By urging the seal lip 16 radially outwardly, the pin and box 12, 14 are locked together to further resist relative movement.

The expansion process also thins the walls of the tubing sections 11, 13 and thus of the connector first and second portions 12, 14. This causes the tubing sections and connector portions to increase in length. However, the overlapping portion of the box 14 experiences a different expansion mode from a remainder of the tubing sections 11, 13 and the connector portions 12, 14. This is because the box 14 is expanded by radially outward expansion of the pin 12, which causes the box 14 to contract in length. The engagement between the pin and box 12, 14 through the seal lip 16 resists axial movement and thus separation of the pin and box. Separation is also resisted by the engagement of wire 21 in grooves 17, 18 and by the engagement between tip 34 and shoulder 36.

Turning now to FIGS. 4, 5, 6 and 7 there are shown views of parts of connectors for expandable tubing in accordance with alternative embodiments of the present invention, the connectors indicated generally by reference numerals 100, 200, 300 and 400, respectively.

Figure 2:
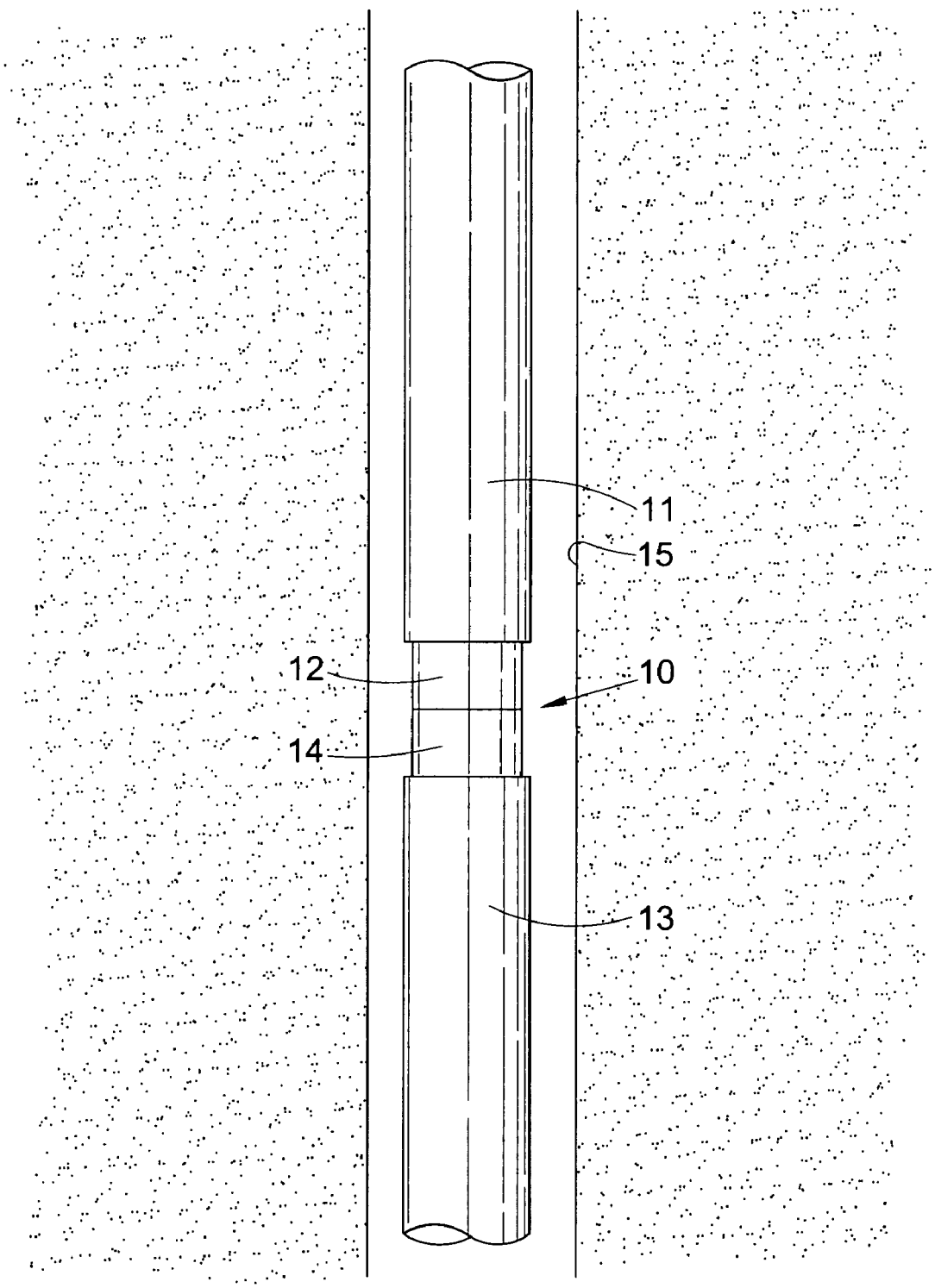
FIG. 2 is a longitudinal sectional view of expandable tubing incorporating the connector of FIG. 1, the tubing shown located in a borehole.

Each of the connectors 100, 200, 300 and 400 are essentially similar to the connector 10 of FIGS. 1 and 2. Accordingly, only the major differences between each of the connectors of FIGS. 4-7 will be described herein in detail. It will also be understood that like components of the connectors of FIGS. 4-7 with the connector 10 of FIGS. 1 and 2 share the same reference numerals incremented by 100, 200, 300 and 400, respectively.

The connector 100 includes a seal lip 116 of a similar shape to the seal lip 16 of the connector 10. However, on expansion of the connector 100, the seal lip 116 is urged radially outwardly into metal to metal contact with an inner surface 44 of the box tapered portion 142. The seal lip 116 is deformed on expansion, to ensure a fluid-tight seal with the box tapered portion 142 is obtained.

Figure 4:
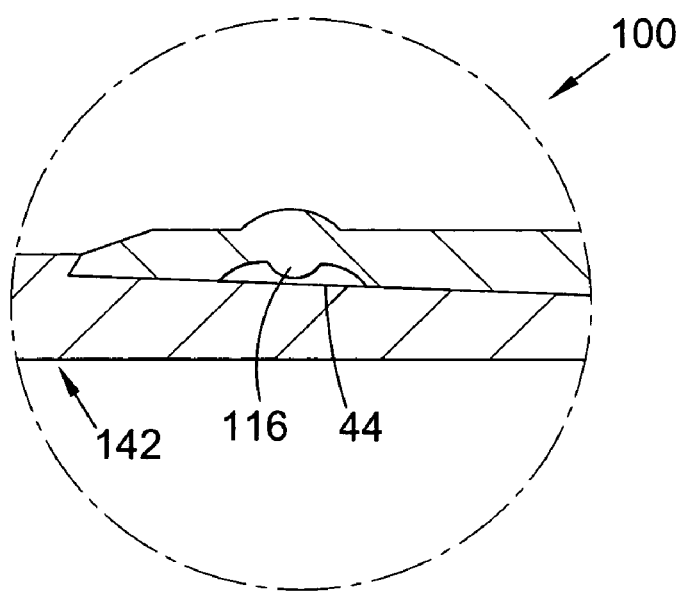
FIG. 4 is an enlarged, longitudinal sectional view of part of a connector for expandable tubing in accordance with an alternative embodiment of the present invention.
Figure 5:
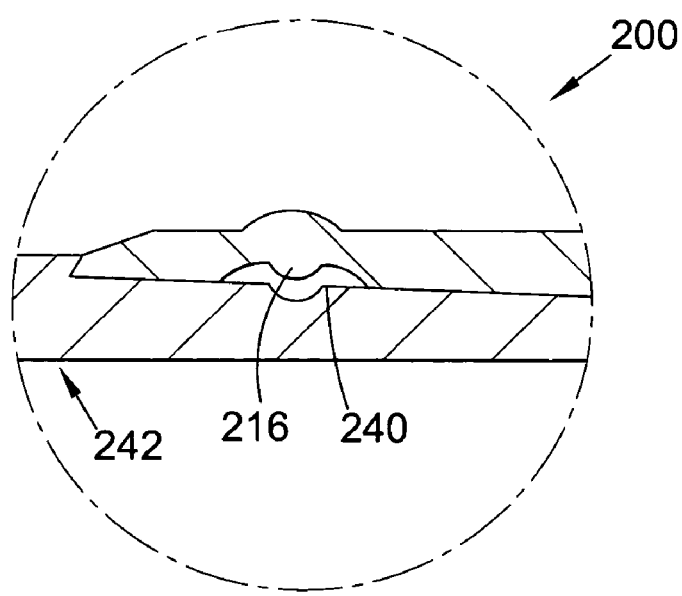
FIG. 5 is an enlarged, longitudinal sectional view of part of a connector for expandable tubing in accordance with a further alternative embodiment of the present invention.

The connector 200 of FIG. 4 includes a seal lip 216 similar to the seal lip 16 of the connector 10, however, the box tapered portion 242 includes a rounded groove 240 of similar shape to the lip 216. The groove 240 is optionally of slightly smaller dimensions than the lip 216. For example, the lip 216 may be of a greater maximum height in the radial direction than the depth of the groove 240. The groove 240 receives the seal lip 216 on expansion of the connector 200 in a metal to metal sealing engagement, and by forming the groove 240 of a relatively shallow depth compared to the lip 216 height, an effective sealing engagement is obtained.

The connector 300 includes a seal lip 316 comprising a base profile 46 of a material having a relatively high yield strength and/or modulus of elasticity, and is typically formed integrally with the pin 12. A seal member 48 of a material having a low yield strength and/or modulus of elasticity (relative to the base profile 46) is mounted on the base profile. The seal member 48 is typically of an elastomeric or rubber material, or of a metal such as bronze or lead, and sealingly engages the inner surface 344 of the box tapered portion 342 on expansion of the connector 300.

Figure 6:
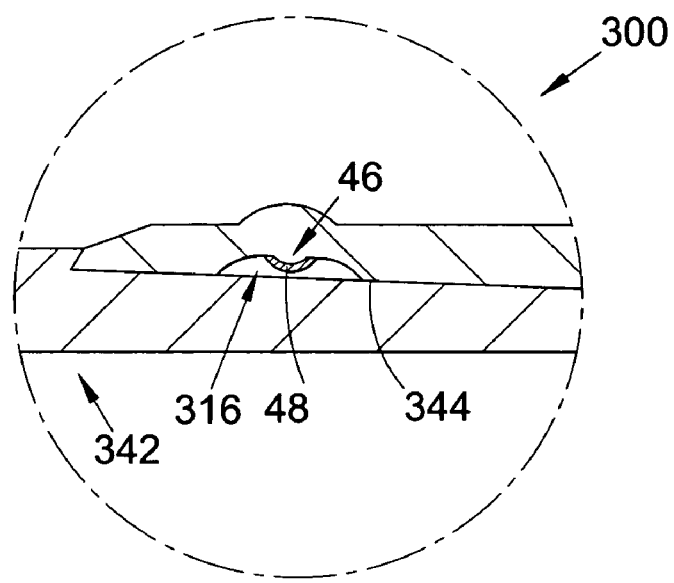
FIG. 6 is an enlarged, longitudinal sectional view of part of a connector for expandable tubing in accordance with a still further alternative embodiment of the present invention.
Figure 7:
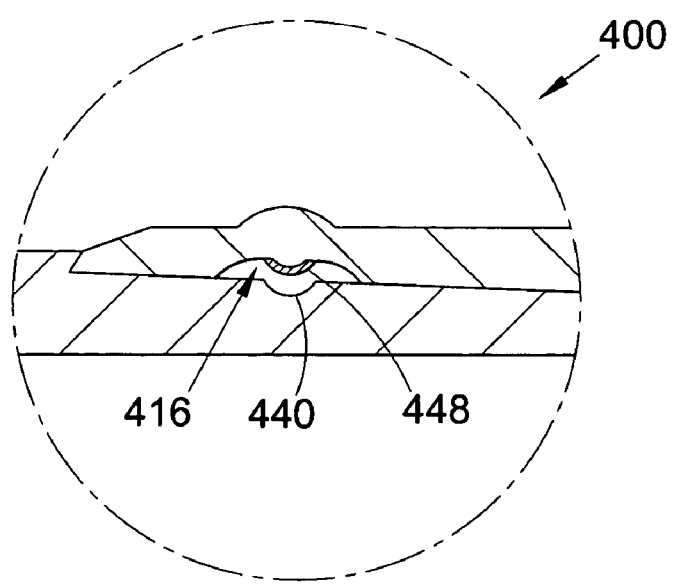
FIG. 7 is an enlarged, longitudinal sectional view of part of a connector for expandable tubing in accordance with a yet further alternative embodiment of the present invention.

The connector 400 is essentially the same as the connector 300 of FIG. 6, except the seal lip 416 is urged outwardly to engage a rounded groove 440.

Various modifications may be made to the foregoing without departing from the spirit or scope of the present invention.

For example, the seal profile may be of any suitable shape or dimensions.

The connector portions may be adapted to be coupled together in a snap, stab or latch lock fit, or in any other suitable fashion.

The seal profile may be adapted to be provided on a portion defining a female portion (box), expansion of a male portion (pin) causing a corresponding expansion of the female portion, thereby bringing the seal profile into sealing engagement with the male portion. The seal profile may therefore be provided on a radially inner surface of the female portion.

The seal profile may be in contact but not sealingly engaged with the other portion. Thus the seal may be in contact but, initially, any force exerted on the seal profile may not be sufficient to produce an adequate seal. In a further alternative, the seal profile may be in sealing engagement with the other one of the first and second portions when in an unexpanded position, and may be moveable to an expanded, enhanced sealing position.

The biasing profile may be provided on an outer surface of one of the first and second portions and the seal profile on an inner surface. When the tubing is expanded, the biasing profile may contact a surface, such as the wall of a borehole, and may be restrained such that expansion causes a relative radially inward movement or displacement of the biasing profile, to exert a biasing force on the seal profile.

The seal profile may be elastically deformable and urged into sealing engagement by a separate deformable or latching member, or may be plastically and elastically deformable, including appropriate separate elastically and plastically deformable areas or sections. The seal profile may comprise a separate member adapted to be coupled to the respective first and second portion.

It will be understood that the seal profile may be urged into sealing engagement with the other portion simply by exerting a force on the seal profile without any expansion of the first and second portions or of the tubing sections. Alternatively, the seal profile may be urged into sealing engagement during and thus as part of the process of expanding the first and second portions/tubing sections. The term 'expansion' should therefore be interpreted accordingly.

Also, the connector may be for non-expandable tubing sections, and the seal profile urged into sealing engagement, or into enhanced sealing engagement with the other portion. Thus the connector may have a utility in non-expandable tubing for providing sealing or an enhanced sealing effect between the first and second connector portions.

The invention claimed is:

1. A method of sealing a connection between tubing sections, the method comprising the steps of:
   coupling a pin of a first tubing section with a box of a second tubing section,
   wherein:
     a biasing profile is located on an inner surface of the pin,
     the biasing profile comprises a rounded lip,
     a seal profile is located on an outer surface of the pin,
     one of the pin and box has a seal made of elastomeric material or of a low yield strength material, and
     the seal profile is opposite to the biasing profile; and
   radially expanding the first and second tubing sections and the pin and box, thereby urging the seal into engagement with the other of the pin and box.

2. The method of claim 1, wherein the tubing sections are located in a downhole environment during and after expansion.

3. The method of claim 1, wherein the seal profile engages the seal during expansion.

4. The method of claim 1, wherein the seal is mounted on the seal profile.

5. The method of claim 4, wherein the seal profile engages a rounded groove during expansion.

6. The method of claim 1, wherein:
   the pin has a tapered portion,
   the box has a tapered portion, and
   the profiles are located on the tapered portions.

7. The method of claim 1, wherein:
   the pin and box each have a helical groove,
   the pin and box are coupled by:
     aligning the helical grooves, thereby forming a cavity; and
     inserting a wire into the cavity.

8. A method of sealing a connection between tubing sections, the method comprising the steps of:
   coupling a pin of a first tubing section with a box of a second tubing section,
   wherein:
     a biasing profile is located on an inner surface of the pin,
     the biasing profile comprises a rounded lip,
     a seal profile is located on an outer surface of the pin,
     one of the pin and box has a seal made of elastomeric material or of a low yield strength material,
     the seal profile is opposite to the biasing profile, and
     the seal engages the other of the first and second portions; and
   radially expanding the first and second tubing sections and the pin and box, thereby enhancing engagement of the seal with the other of the pin and box.

9. The method of claim 8, wherein the tubing sections are located in a downhole environment during and after expansion.

10. The method of claim 8, wherein the seal profile engages the seal.

11. The method of claim 8, wherein the seal is mounted on the seal profile.

12. The method of claim 11, wherein the seal profile engages a rounded groove.

13. The method of claim 8, wherein:
the pin has a tapered portion,
the box has a tapered portion, and
the profiles are located on the tapered portions.

14. The method of claim 8, wherein:
the pin and box each have a helical groove,
the pin and box are coupled by:
   aligning the helical grooves, thereby forming a cavity; and
   inserting a wire into the cavity.

15. A method of sealing a connection between tubing sections, the method comprising the steps of:
   coupling a pin of a first tubing section with a box of a second tubing section,
   wherein:
     the pin has a biasing profile protruding from an inner surface thereof,
     the pin has a groove formed in an outer surface thereof opposite from the biasing profile,
     the pin has a seal disposed in the groove, and the seal sealingly engages the box; and radially expanding the first and second tubing sections and the pin and box, thereby enhancing engagement of the seal with the box.

16. The method of claim 15, wherein the pin and box are threaded.

17. The method of claim 15, wherein the seal is made of elastomeric material or of a low yield strength material.

18. The method of claim 15, wherein the biasing profile comprises a lip.

19. The method of claim 15, wherein the tubing sections are located in a downhole environment during and after expansion.

20. A method of sealing a connection between tubing sections, the method comprising the steps of:

coupling a first connector portion of a first tubing section with a second connector portion of a second tubing section, wherein:

one of the first and second connector portions has a biasing profile, one of the first and second connector portions has a seal profile, the seal profile is opposite to the biasing profile, the first connector portion has the seal and biasing profiles, and the seal profile comprises a first rounded lip formed in a base of a groove of the first connector portion; and radially expanding the first and second tubing sections and the connector portions, thereby urging the seal profile into sealing engagement with the other of the first and second portions.

21. The method of claim 20, wherein the tubing sections are located in a downhole environment during and after expansion.

22. A method of sealing a connection between tubing sections, the method comprising the steps of:

coupling a first connector portion of a first tubing section with a second connector portion of a second tubing section, wherein:

one of the first and second connector portions has a biasing profile, one of the first and second connector portions has a seal profile, the seal profile is opposite to the biasing profile, and the seal profile sealingly engages the other of the first and second portions, the first connector portion has the seal and biasing profiles, and the seal profile comprises a first rounded lip formed in a base of a groove of the first connector portion; and radially expanding the first and second tubing sections and the connector portions, thereby enhancing engagement of the seal profile with the other of the first and second portions.

23. The method of claim 22, wherein the tubing sections are located in a downhole environment during and after expansion.

24. A method of sealing a connection between tubing sections, the method comprising the steps of:

coupling a first connector portion of a first tubing section with a second connector portion of a second tubing section, wherein:

the first connector portion has a biasing profile and a seal profile, the seal profile comprises a first rounded lip formed in a base of a groove of the first connector portion, one of the first and second connector portions has a seal made of elastomeric material or of a low yield strength material, and the seal profile is opposite to the biasing profile; and radially expanding the first and second tubing sections and the connector portions, thereby urging the seal into engagement with the other of the first and second portions.

25. The method of claim 24, wherein the biasing profile comprises a second rounded lip.

26. The method of claim 25, wherein:

the seal profile engages a groove of the second connector portion during expansion, and the groove has slightly smaller dimensions than the seal profile.

27. A method of sealing a connection between tubing sections, the method comprising the steps of:

coupling a first connector portion of a first tubing section with a second connector portion of a second tubing section, wherein:

the first connector portion has a biasing profile and a seal profile, the seal profile comprises a first rounded lip formed in a base of a groove of the first connector portion, one of the first and second connector portions has a seal made of elastomeric material or of a low yield strength material, the seal profile is opposite to the biasing profile, and the seal engages the other of the first and second portions; and radially expanding the first and second tubing sections and the connector portions, thereby enhancing engagement of the seal with the other of the first and second portions.

28. The method of claim 27, wherein the biasing profile comprises a second rounded lip.

29. The method of claim 28, wherein:

the seal profile engages a groove of the second connector portion, and the groove has slightly smaller dimensions than the seal profile.

* * * * *

UNITED STATES PATENT AND TRADEMARK OFFICE
CERTIFICATE OF CORRECTION

| | | |
|---|---|---|
| PATENT NO. | : 7,895,726 B2 | Page 1 of 1 |
| APPLICATION NO. | : 10/848544 | |
| DATED | : March 1, 2011 | |
| INVENTOR(S) | : Maguire | |

It is certified that error appears in the above-identified patent and that said Letters Patent is hereby corrected as shown below:

Title page

<u>In the References Cited (56):</u>

Please insert --3,851,983 A 12/1974 MacKenzie--.

Signed and Sealed this
Fifth Day of July, 2011

David J. Kappos
*Director of the United States Patent and Trademark Office*